(12) United States Patent  
Silvanus et al.

(10) Patent No.: US 9,308,691 B2  
(45) Date of Patent: Apr. 12, 2016

(54) DEVICE AND METHOD FOR PRODUCING A THREE DIMENSIONAL OBJECT

(71) Applicant: EADS Deutschland GmbH, Ottobrunn (DE)

(72) Inventors: Juergen Silvanus, Unterhaching (DE); Katja Schmidtke, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 441 days.

(21) Appl. No.: 13/948,819

(22) Filed: Jul. 23, 2013

(65) Prior Publication Data

US 2014/0061977 A1 Mar. 6, 2014

(30) Foreign Application Priority Data

Jul. 24, 2012 (DE) .......................... 10 2012 014 577

(51) Int. Cl.
  *B22F 3/00* (2006.01)
  *B22F 3/105* (2006.01)
  *B29C 67/00* (2006.01)
  *B23K 26/342* (2014.01)

(52) U.S. Cl.
  CPC .............. *B29C 67/0077* (2013.01); *B22F 3/00* (2013.01); *B22F 3/105* (2013.01); *B22F 3/1055* (2013.01); *B23K 26/342* (2015.10); *B29C 67/00* (2013.01); *B22F 2003/1059* (2013.01); *B22F 2999/00* (2013.01); *Y02P 10/295* (2015.11)

(58) Field of Classification Search
  CPC ........... B22F 3/00; B22F 3/105; B29C 67/00; B23K 26/342
  USPC ......... 156/62.2, 277; 264/112, 113, 482, 484; 425/174.4; 219/121.65, 121.66; 141/18; 419/47; 427/189–195; 700/118–120
  See application file for complete search history.

(56) References Cited

U.S. PATENT DOCUMENTS

| 4,710,346 A | * | 12/1987 | Rossman | ................... B22F 9/00 419/68 |
| 5,053,090 A | * | 10/1991 | Beaman | ................... B22F 3/004 156/272.8 |
| 5,354,414 A | | 10/1994 | Feygin | |
| 5,658,412 A | | 8/1997 | Retallick et al. | |
| 2002/0145213 A1 | * | 10/2002 | Liu | ..................... B29C 67/0081 264/40.1 |
| 2002/0152002 A1 | * | 10/2002 | Lindemann | ........... B22F 3/1055 700/119 |

FOREIGN PATENT DOCUMENTS

| DE | 43 00 478 C1 | 8/1994 |
| DE | 296 24 498 U1 | 7/2004 |
| DE | 10 2007 018 126 A1 | 10/2008 |
| DE | 10 2010 050 711 A1 | 5/2012 |

OTHER PUBLICATIONS

German Office Action dated Mar. 1, 2013 (six (6) pages).

* cited by examiner

*Primary Examiner* — Samuel M Heinrich
(74) *Attorney, Agent, or Firm* — Crowell & Moring LLP

(57) ABSTRACT

A device for producing a three dimensional object from a powdery material by solidifying the powdery material through the application of energy includes a working surface, an application device for applying the powdery material onto the working surface, and a solidifying device for solidifying the powdery material applied onto the working surface. The application device can apply predefined, locally different amounts of powdery material and includes a transfer device, which can be magnetized and/or electrostatically charged and discharged, as well as a magnetizing and/or charging device.

15 Claims, 4 Drawing Sheets

DEVICE AND METHOD FOR PRODUCING A THREE DIMENSIONAL OBJECT

CROSS-REFERENCE TO RELATED APPLICATIONS

Figure 1:
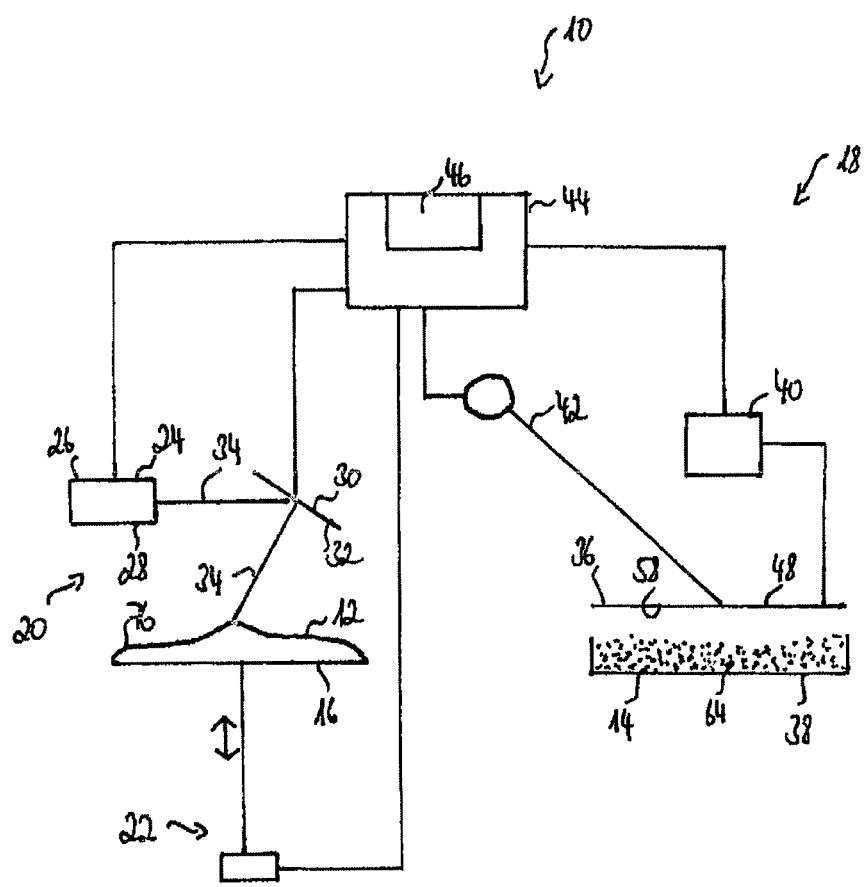

The present application claims priority under 35 U.S.C. §119 to German Patent Application No. 10 2012 014 577.2, filed Jul. 24, 2012, the entire disclosure of which is herein expressly incorporated by reference.

BACKGROUND AND SUMMARY OF THE INVENTION

Exemplary embodiments of the present invention relate to a device and a method for producing a three dimensional object through selective solidification of a powdery material by means of the application of energy.

Such devices and methods are known, for example, from German Patent documents DE 43 00 478 C1, DE 296 24 498 U1, and DE 10 2007 018 126 A1.

The following approaches are known for producing three dimensional objects using selective solidification by applying energy on a powdery material.

Either a powdery material is layered in a bed of powder and then selectively irradiated, for example, with electromagnetic radiation, so that the powdery material sinters at predetermined locations, and the three dimensional object is produced.

As an alternative, the powdery material can be applied in thin layers one after the other on a working surface and then can be solidified through the selective application of energy at locations, at which the powdery material is supposed to form a layer of the three dimensional object. For this purpose the powdery material is first spread over the working surface and then smoothed into a uniform layer using a wiper or a blade.

In both the first and second approaches the excess powdery material remains on the working surface, but this excess is not needed for solidifying and for producing the three dimensional object.

Powdery materials exhibiting relatively expensive base materials that are available only to a limited degree are typically used in the manufacture of high temperature components, so that it is desirable to use the smallest possible amount of powdery material when producing a three dimensional object.

Exemplary embodiments of the present invention are directed to a more effective device and method for producing a three dimensional object through selective solidification of a powdery material by means of the application of energy.

Exemplary embodiments of the present invention provide a device for producing a three dimensional object from a powdery material by solidifying the powdery material through the application of energy has a working surface, on which the three dimensional object is constructed. Furthermore, the present invention is directed to an application device for applying the powdery material onto the working surface; and there is a solidifying device for solidifying the powdery material applied onto the working surface. In this case the application device for applying the predefined, locally different amounts of powdery material onto the working surface comprises a transfer device, which can be magnetized and/or can be electrostatically charged and discharged and which is designed for transferring the powdery material to the working surface, as well as comprises a magnetizing and/or charging device for the purpose of magnetizing and/or electrostatically charging and discharging the transfer device.

It is known from, for example, the laser printing method to apply toner in a selective manner on the material to be printed at predefined positions by means of an electrostatically charged or magnetized image drum surface. In this case the image drum functions as the transfer device for transferring the toner onto the material to be printed.

At the same time the image drum is uniformly charged and/or magnetized over its entire surface; and then the charge is quenched at defined locations through the application of light. The toner powder is configured in such a way that it is uniformly deposited only on either the charged locations or the neutralized locations.

At this point the transfer device functions, as required, to transfer the powdery material onto the working surface of the device for producing a three dimensional object.

However, in this case the transfer device is not designed to transfer a toner material that has been developed specifically to be deposited in a uniform layer thickness on an image drum that has been either charged or magnetized as required. Rather, the transfer device is designed in such a way that the powdery material, which is configured in its properties not specifically to be deposited on the transfer device, but rather is optimized for producing the three dimensional object with special properties, can be deposited on the surface of the transfer device.

For this purpose there is a magnetizing and/or charging device that can magnetize and/or electrostatically charge and discharge the transfer device as a function of the powdery material that is to be deposited.

Preferably the magnetizing and/or charging device is designed for locally magnetizing and/or for locally electrostatically charging and discharging the transfer device at predefined positions.

As a result, the transfer device can be electrostatically charged or magnetized at very specific positions, so that the powdery material is deposited advantageously only at these positions. It is also possible to configure the magnetization and/or the charging of the transfer device in such a way that the powdery material is deposited on the transfer device not only at locally different positions, but also that different amounts of the powdery material can be deposited in an advantageous way.

An additional advantageous feature lies in the fact that the transfer device is adapted in terms of geometry to the working surface and has, in particular, the same width extension and/or length extension as the working surface.

Consequently the transfer device with the deposited powdery material can be easily arranged preferably over the working surface and can be demagnetized or discharged, so that the powdery material falls in an advantageous manner directly on the desired positions on the working surface. Hence, a lateral movement of the transfer device parallel to the working surface can be dispensed with in this advantageous way.

It is especially preferred that the transfer device be formed by means of a roller and/or by means of a plate.

A design in the form of a plate has the advantage that the transfer device has to be moved only over the working surface; and the powdery material can be applied preferably without movement in additional spatial directions.

A roller has the advantage that the rolled-up surface that transfers the powdery material can advantageously reduce the space requirement in the entire system.

To this end it is advantageous for the roller to have a circumference that corresponds to the width extension of the working surface in the rolling direction of the roller.

As an alternative, the plate and/or the roller can also be constructed so as to be shorter or rather narrower than the working surface, or more specifically the roller can have a smaller circumference than the width extension of the working surface. This feature has the advantage that the transfer device can be constructed preferably small and, as a result, can reduce in an advantageous way the space requirement. Then there are a number of steps for carrying out the transfer of a layer of the powdery material onto the entire working surface.

Preferably a supply device for storing the powdery material that is to be placed onto the working surface is provided.

Then the transfer device can receive in an advantageous way from the supply device the desired amount of powdery material at the desired positions and can then transfer this powdery material onto the working surface.

If, in addition, the supply device has the same length and/or width extension as the transfer device and/or the working surface, then the transfer of the powdery material from the supply device onto the working surface is preferably extremely simple, because only the transfer device is arranged preferably over and/or in the supply device, in order to receive the powdery material; and then a layer of the powdery material can be applied advantageously onto the working surface in one step.

As an alternative, however, the transfer device, the working surface and the supply device can also have different dimensions. This difference can be balanced in an advantageous way by means of the transfer device, if this transfer device can be guided preferably laterally over the supply device and/or the working surface, or if this transfer device is constructed in terms of geometry to match.

It is particularly preferred that the magnetizing and/or charging device be configured for magnetizing and/or charging a transfer device, which is arranged in and/or over the supply device, at predefined positions and for demagnetizing and/or discharging the transfer device, which is arranged on and/or over the working surface, at predefined positions.

As a result, two alternative transfer methods for transferring the powdery material from the supply device onto the working surface can be carried out in an advantageous way.

Either the transfer device is completely coated with the powdery material and allows powdery material to fall onto the working surface by selectively demagnetizing and/or selectively discharging on and/or over the working surface preferably only at predefined positions.

As an alternative, however, the transfer device can also receive the powdery material only at predefined positions of its own surface; and then the powdery material is allowed to fall onto the working surface.

In the event that a roller is used, the roller is mounted over the supply device and/or the working surface in such a way that said roller can be rotated in an advantageous way.

As a result, the roller can be rotated over the supply device and/or the working surface, so that in this way said roller can advantageously receive and dispense in a space saving way the powdery material.

Preferably a motion device for moving the transfer device between the supply device and the working surface is provided.

As a result, the transfer device can be moved back and forth between the supply device and the working surface; and, hence, the powdery material can be transported in an advantageous way from the supply device onto the working surface.

It is particularly preferred that the motion device be designed for moving the transfer device in three spatial directions and/or for rotating and/or pivoting the transfer device.

The more movable the motion device, the more space can be saved preferably in the entire system.

Then in the case that the motion device can move back and forth only between the supply device and the working surface, it is advantageous for the transfer device and also the supply device to be adapted in terms of geometry exactly to the working surface.

If, however, the motion device can also move the transfer device in additional spatial directions and can also rotate or more specifically can pivot said transfer device, then the supply device and/or the transfer device can also be designed with significantly smaller dimensions than the working surface, so that preferably space in the entire system can be saved.

The method is carried out advantageously not only essentially horizontally to the working surface but also essentially vertically thereto. In particular, the method can be carried out in all directions between the horizontal direction up to the vertical direction to the working surface. For example, the transfer device can be tilted into the vertical plane from the horizontal plane, so that the transfer device can be oriented essentially between horizontally up to vertically to the working surface, when the powdery material is applied and/or when the transfer device is moved over the working surface. In this case the powdery material can be applied at individual predefined positions or at a plurality of predefined positions. Hence, the rate of time required to complete a three dimensional object decreases.

Preferably a control unit is provided for controlling the magnetizing and/or charging device and/or the motion device and/or the solidifying device.

Depending on how the desired layer is supposed to look, the control unit can control preferably, as required, the magnetizing and/or charging of the transfer device and can also control advantageously, as required, the motion device to the effect that said control unit moves the transfer device to the desired positions. In addition, the control unit can also actuate in an advantageous way the solidifying device that then solidifies the powdery material that is applied onto the working surface.

Preferably the control unit comprises a memory unit that has stored in an advantageous way a construction plan with the desired final contour of the three dimensional object. The construction plan can be stored, for example, in the form of 3D CAD data. Then the control unit can control in an advantageous way, as a function of the construction plan data stored in the memory unit, the motion device, the magnetizing and/or charging device, the solidifying device and/or the working surface, so that the three dimensional objects can be produced preferably according to the stored construction plan.

The solidification of the powdery material can be implemented, for example, by electromagnetic radiation, such as a laser beam. In this case a laser beam is advantageously guided by the control unit, preferably guided selectively by means of an optical device, such as a mirror arrangement, to predefined positions, onto which the powdery material has been applied selectively by means of the transfer device.

As an alternative, it is also possible to use an electron beam, instead of electromagnetic radiation. It is also conceivable to solidify the selectively applied powdery material preferably by intensive applications of heat. When the powdery material is applied essentially between the horizontal direction up to the vertical direction, the optical system can be advantageously aligned in such a way that a laser beam, an electron beam or the beam of a heat source impinges horizontally or obliquely on the powdery material to be solidified.

The working surface is adjustable up and down in the advantageous embodiment.

As a result of this vertical adjustability, the working surface can be lowered by a predefined path after each solidification step, in order to be able to apply in this way the next layer of the powdery material on the working surface at the same level as during the previous step. For example, this feature also makes it possible to dispense advantageously with a height adjustment of the transfer device by means of the motion device.

In a method for producing a three dimensional object from a powdery material by means of selective solidification through the application of energy, the object is produced layer by layer in such a way that in each case a layer of the powdery material is applied and solidified on a working surface. In order to apply the layer of powdery material, the following steps are carried out:
a) positioning a transfer device for applying the powdery material on the working surface over or in a supply device;
b) magnetizing and/or electrostatically charging the transfer device, so that the powdery material is deposited on the transfer device;
c) moving the transfer device on or over the working surface;
d) demagnetizing and/or discharging the transfer device, so that the powdery material falls onto the working surface at predefined points.

Following the demagnetizing and/or discharging of the transfer device, the powdery material is advantageously scraped off with a blade.

The transfer device is advantageously magnetized and/or electrostatically charged in a selective manner at predefined positions either over and/or in the supply device or on and/or over the working surface.

Following the selective solidification of the powdery material, the working surface is preferably lowered; and an additional layer of the powdery material is applied.

BRIEF DESCRIPTION OF THE DRAWING FIGURES

Figure 2:
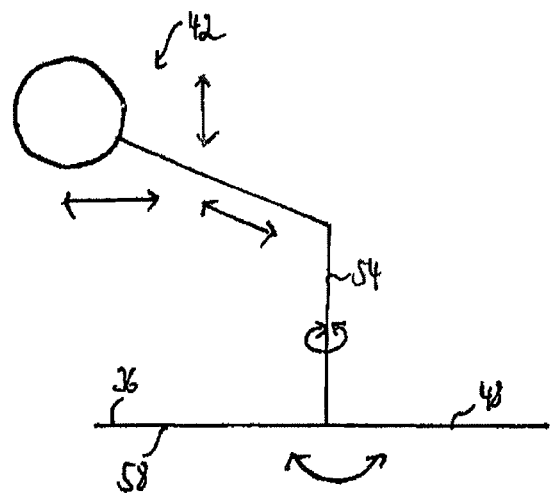
Figure 3:
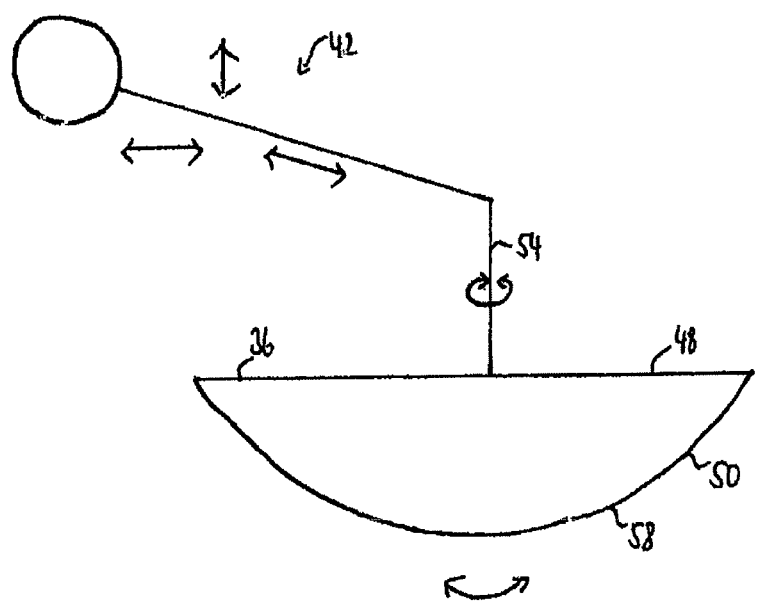
Figure 4:
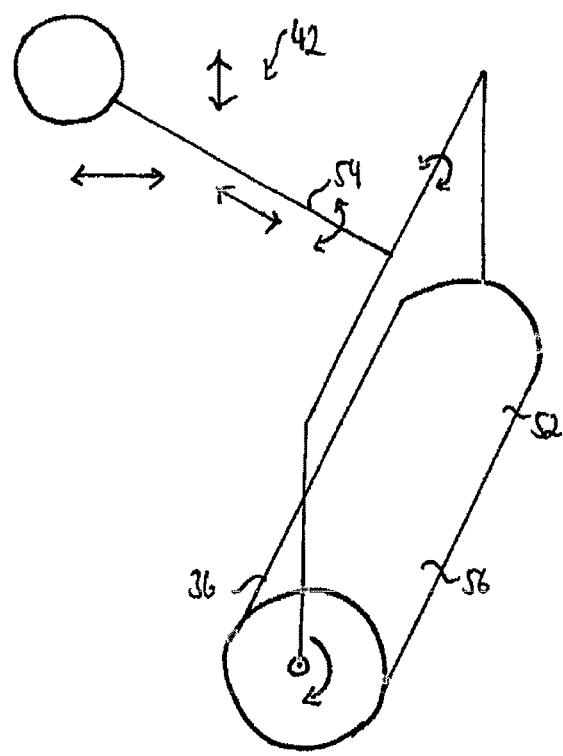
Figure 5:
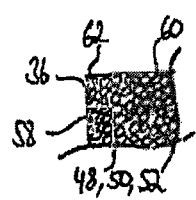
Figure 6:
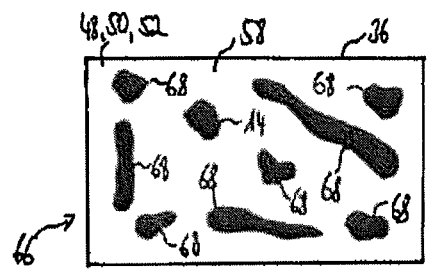
Figure 7:
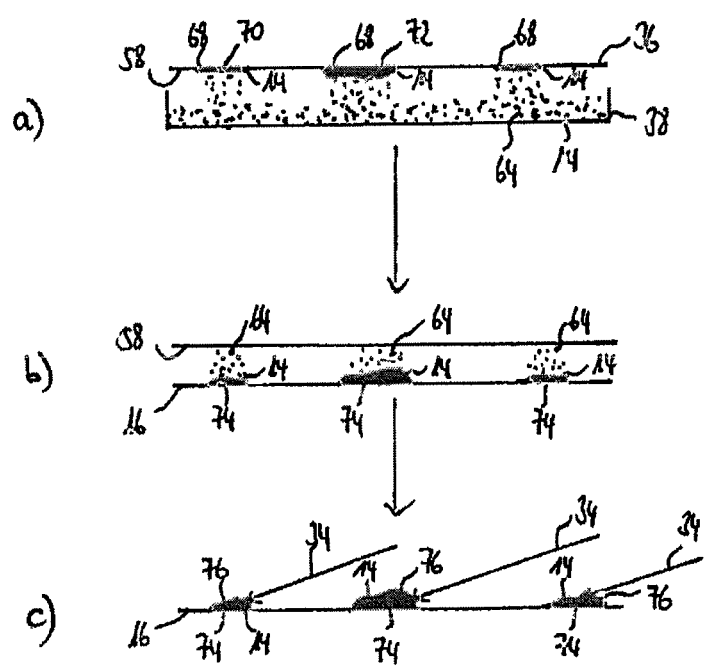

Advantageous embodiments of the invention are explained in detail below with reference to the accompanying drawings. The drawings show in FIG. 1 a device for producing a three dimensional object with a transfer device for transferring a powdery material onto a working surface;

FIG. 2 a first embodiment of the transfer device from FIG. 1;

FIG. 3 a second embodiment of the transfer device from FIG. 1;

FIG. 4 a third embodiment of the transfer device from FIG. 1;

FIG. 5 a subarea of a surface of the transfer devices from FIG. 2 to FIG. 4;

FIG. 6 a surface of the transfer devices from FIG. 2 to FIG. 4 with the deposited powdery material;

FIG. 7a) the deposition of powdery material on the transfer devices from FIG. 2 to FIG. 4;

FIG. 7b) the descent of the powdery material, deposited on the transfer devices, onto a working surface; and FIG. 7c) the irradiation of the powdery material, which has dropped onto the working surface, for solidification.

DETAILED DESCRIPTION

FIG. 1 shows a device 10 for producing a three dimensional object 12 made of a powdery material 14 through the solidification of the powdery material 14 by means of the application of energy.

The device 10 comprises a working surface 16, an application device 18 for applying the powdery material 14 onto the working surface 16 as well as a solidifying device 20 for solidifying the powdery material 14.

The working surface 16 is vertically adjustable by means of a height adjustment device 22.

The solidifying device 20 is formed by means of an irradiation device 24, in this case a laser device 26. The laser device 26 comprises a laser beam emitting unit 28 as well as a deflecting device 30 in the form of a mirror 32, which directs a laser beam 34, emitted from the laser beam emitting unit 28, onto the powdery material 14, which is deposited in layers on the working surface 16. Due to the energy from the laser beam 34, the powdery material 14 is sintered and, thus, solidified. Instead of the laser beam 34, an electron beam can also be used for applying energy to the powdery material 14. Furthermore, the powdery material 14 can also be sintered or more specifically solidified by heating the entire working surface 16.

The application device 18 comprises a transfer device 36, with which the powdery material 14 can be transferred from a supply device 38, in which the powdery material 14 is stored, onto the working surface 16.

To this end the device 10 comprises a magnetizing and/or charging device 40, with which the transfer device 36 can be magnetizing and/or electrostatically charged.

In addition, there is a motion device 42 that can move the transfer device 36 back and forth between the working surface 16 and the supply device 38.

A control unit 44 controls the height adjustment device 22, the laser beam emitting unit 28, the mirror 32, the magnetizing and/or charging device 40 as well as the motion device 42, so that a desired amount of powdery material 14 is applied onto the working surface 16 at the desired locations and is solidified in a selective manner by means of the laser beam 34.

The control unit 44 has a memory unit 46 that has stored a construction plan for the three dimensional object 12 to be produced in such a way that the control unit 44 can actuate the individual elements of the device 10 in such a way that the three dimensional object 12 can be produced according to the stored construction plan.

The transfer device 36 can be formed by a plate 48, which is depicted in a first embodiment in FIG. 2. In this case the plate can have, as shown in FIG. 3, a convex surface 50. As an alternative, the transfer device 36 can also be formed, as shown in FIG. 4, by means of a roller 52.

The motion device 42 can move, as indicated by the arrows in FIG. 2 to FIG. 4, the transfer device 36 in all three spatial directions. That is, the motion device can adjust for height the transfer device, can move it between the working surface 16 and the supply device 38, and can shift it horizontally parallel to the working surface 16 and/or the supply device 38. In addition, the motion device 42 can rotate the transfer device 36 about a central axis 54 and pivot said transfer device about an additional axis that is arranged perpendicular to the central axis 54.

FIG. 4 shows an embodiment of the transfer device 36 as a roller 52, where this roller 52 is mounted on the motion device 42 in such a way that it can also be rotated.

The transfer devices 36, shown in FIG. 2 to FIG. 4, are adapted in geometric terms to the working surface 16. This means that the plates 48 have the same width and length extension as the working surface 16; and that the roller 52 has a circumference 56 that corresponds to the length extension and/or the width extension of the working surface 16.

As an alternative, however, it is also possible to configure the plates 48 and/or the roller 52 with smaller dimensions.

That is, the plates 48 can be narrower and/or shorter than the working surface 16; and, moreover, the roller can exhibit a smaller circumference 56.

A surface 58 of the transfer devices 36, shown in FIG. 2 to FIG. 4, has a plurality of magnetic heads 60 and/or charging points 62, which are depicted in FIG. 5. The magnetic heads 60 and/or the charging points 62 can be individually actuated by means of the magnetizing and/or charging device 40, so that the magnetization of the magnetic heads 60 can be changed; and/or each of the charging points 62 can be charged differently.

If at this point a transfer device 36, which has been magnetized and/or charged in such a way, is arranged over or in the supply device 38, then the particles 64 of the powdery material 14 will attach themselves to the magnetic heads 60 and/or the charging points 62.

Since each of the magnetic heads 60 and/or the charging points 62 can be actuated individually, a deposition pattern 66 according to FIG. 6 can be produced.

As an alternative, the entire surface 58 can also be provided with powdery material 14 by magnetizing and/or charging all of the magnetic heads 60 and/or charging points 62. Only after the motion device 42 has arranged the transfer device 36 over the working surface 16, can the surface 58 then be demagnetized and/or discharged in a selectively individual way by demagnetizing the magnetic heads 60 and/or by discharging the charging points 62.

If at this point the transfer device 36 is moved over the working surface 16 by means of the motion device 42 and if the magnetic heads 60 are demagnetized and/or the charging points 62 are discharged, then the powdery material 14 will fall onto the working surface 16 in accordance with the pattern depicted in FIG. 6.

The powdery material 14, which is used to produce the three dimensional objects 12, often comprises a mixture of different base materials, for example, different metals, like rhenium, chromium, aluminum, magnesium, tantalum, etc., with various non-metallic materials. In this respect the powdery material is fundamentally different from the homogenous toner that is used in laser technology. Due to the application of a plurality of small magnetic heads 60 and/or charging points 62, which can be actuated individually, all of the materials exhibiting different properties can still be deposited on the surface 58 by way of electrostatic attraction and/or magnetic interaction.

FIGS. 7a) to 7c) show the steps of the method for producing the three dimensional object 12.

In FIG. 7a the surface 58 of the transfer device 36 is electrostatically charged in a selective manner at individually predefined positions 68. The electrostatic attraction causes the particles 64 of the powdery material 14, which is stored in the supply device 38, to attach themselves at the selectively charged positions 68. In this case the first position 70 is not charged as much as a second position 72, so that more particles 64 attach themselves at the second position 72 than the first position 70.

In FIG. 7b) the surface 58 of the transfer device 36 is discharged, so that the particles 64 of the powdery material 14 no longer adhere to the surface 58 due to the electrostatic attraction forces and, as a result, drop off from the transfer device 36. The working surface 16 is arranged underneath the transfer device 36 in such a way that the particles 64 fall onto the working surface 16 at defined positions 74.

Depending on the configuration of the transfer device 36, the transfer device 36 remains statically over the working surface 16, for example, at a plate 48, which has the same dimensions as the working surface 16, or is guided horizontally over the working surface 16, for example, when the plate 48 is constructed with smaller dimensions than the working surface 16. As an alternative, the surface 58 can also roll over the working surface 16, for example, the configuration with a roller 52.

In FIG. 7c) the positions 74 of the working surface 16 with the powdery material 14, which is applied on said working surface, are irradiated selectively with electromagnetic radiation, for example, with the laser beam 34, so that the powdery material 14 solidifies here.

The steps shown in FIGS. 7a) to 7c) are carried out repeatedly in succession until a three dimensional object 12 has been generated according to the construction plan stored in the memory unit 46. Each step of this process generates a layer 76 of the three dimensional object 12. Thereafter, powdery material 14 is applied once again in a selective manner onto the generated layer 76; and this layer in turn solidifies. This process is carried out until the three dimensional object 12 is finished.

With the prior art methods and devices 10 for producing three dimensional objects 12 it was necessary in the past to transport large volumes of powdery material 14 inside the device 10, because the volumetric amount of the design space had to be covered by the powdery material 14. However, this condition is extremely disadvantageous when the powdery material 14 is expensive and only available to a very limited extent.

The previous methods known from the prior art for applying the powdery material 14 onto the working surface 16 consist of applying an excess volume of powder onto the working surface 16 and then scraping off this powder with, for example, a blade or a wiper.

At this point it is proposed to charge or discharge in a locally electrostatic manner a geometrically suitable functional element in the form of the transfer device 36 inside the device 10. Such an approach allows the powder to be loaded very precisely onto the transfer device 36, for example, a roller 52 or a plate 48. The exactly required amount of powdery material 14 can be received in a locally resolved manner from the supply device 38 and can be positioned on the working surface 16 of the device 10.

The phenomena of electrostatics are based on the forces that exert electric charges on each other. These forces are described by Coulombs law. Even if the described forces appear to be small, the electric force is high compared, for example, to the gravitational force.

As an alternative, magnetic forces can also be used.

Such magnetic forces offer the advantage of being able to apply precisely that amount of powder per construction step that is needed at that instant as well as the advantage of being able to place locally volumes of powder, in order to eliminate imperfect spots of the previous construction step.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 device
12 three dimensional object
14 powdery material
16 working surface
18 application device 20 solidifying device
22 height adjustment device
24 irradiation device
26 laser device
28 laser beam emitting unit
30 deflecting device
32 mirror
34 laser beam
36 transfer device
38 supply device
40 magnetizing and/or charging device
42 motion device
44 control unit
46 memory unit
48 plate
50 convex surface
52 roller
54 central axis
56 circumference
58 surface
60 magnetic head
62 charging point
64 particle
66 deposition pattern
68 position
70 first position
72 second position
74 position
76 layer

What is claimed is:

1. A device for producing a three dimensional object from a powdery material by solidifying layer by layer the powdery material through the application of energy, the device comprising:
a working surface;
an application device configured to apply predefined, locally different amounts of powdery material of the powdery material onto the working surface; and
a solidifying device configured to solidify the powdery material applied onto the working surface,
wherein the application device comprises
a transfer device, which can be magnetized and/or can be electrostatically charged and discharged and which is configured to transfer the powdery material to the working surface; and
a magnetizing or charging device configured to magnetize or electrostatically charge and discharge the transfer device.

2. The device as claimed in claim 1, wherein the magnetizing or charging device is configured to locally magnetize or electrostatically charge and discharge the transfer device at predefined positions.

3. The device as claimed in claim 1, wherein the transfer device has a same width extension or length extension as the working surface.

4. The device as claimed in claim 1, wherein the transfer device is a roller or a plate.

5. The device as claimed in claim 4, wherein the roller has a circumference corresponding to a width extension of the working surface in a rolling direction of the roller.

6. The device as claimed in claim 1, further comprising:
a supply device configured to store the powdery material that is to be placed onto the working surface.

7. The device as claimed in claim 6, wherein the supply device has a same length or width extension as the transfer device or the working surface.

8. The device as claimed in claim 6, wherein the magnetizing or charging device is configured to
magnetize or charging a transfer device, which is arranged in or over the supply device, at predefined positions; and
demagnetize or discharge the transfer device, which is arranged on or over the working surface, at the predefined positions.

9. The device as claimed in claim 6, wherein the transfer device is a roller rotatably mounted over the supply device or the working surface.

10. The device as claimed in claim 6, further comprising:
a motion device configured to move the transfer device between the supply device and the working surface.

11. The device as claimed in claim 10, wherein the motion device is configured to move the transfer device in three spatial directions or to rotate or pivot the transfer device.

12. The device as claimed in claim 10, further comprising:
a control unit configured to control the magnetizing or charging device, the motion device, or the solidifying device.

13. The device as claimed in claim 1, wherein the working surface is adjustable in a height direction.

14. A method for producing a three dimensional object from a powdery material by means of selective solidification through the application of energy, wherein the object is produced layer by layer in such a way that a layer of a powdery material is applied and solidified on a working surface; and wherein applying of the layer of powdery material comprises the steps of:
a) positioning a transfer device for applying the powdery material on the working surface over or in a supply device;
b) magnetizing or electrostatically charging the transfer device at predefined positions, so that the powdery material is deposited on the transfer device;
c) moving the transfer device on or over the working surface;
d) demagnetizing or discharging the transfer device at predefined positions, so that the powdery material falls onto the working surface at predefined positions.

15. The method as claimed in claim 14, wherein following the selective solidification of the powdery material, the working surface is lowered and an additional layer of the powdery material is applied.

* * * * *